United States Patent
Alshinnawi et al.

(10) Patent No.: US 9,373,957 B2
(45) Date of Patent: Jun. 21, 2016

(54) POWER BALANCING IN POWER DISTRIBUTION NETWORKS

(71) Applicant: Lenovo Enterprise Solutions (Singapore) PTE. LTD., Singapore (SG)

(72) Inventors: Shareef Alshinnawi, Durham, NC (US); Gary D. Cudak, Creedmoor, NC (US); Edward S. Suffern, Chapel Hill, NC (US); John M. Weber, Wake Forest, NC (US)

(73) Assignee: LENOVO ENTERPRISE SOLUTIONS (SINGAPORE) PTE. LTD., Serangoon Garden (SG)

( * ) Notice: Subject to any disclaimer, the term of this patent is extended or adjusted under 35 U.S.C. 154(b) by 384 days.

(21) Appl. No.: 14/055,150

(22) Filed: Oct. 16, 2013

(65) Prior Publication Data
US 2015/0102673 A1 Apr. 16, 2015

(51) Int. Cl.
| | | |
|---|---|---|
| H02J 1/00 | (2006.01) | |
| H02J 3/14 | (2006.01) | |
| H02J 3/26 | (2006.01) | |
| G06F 1/28 | (2006.01) | |
| H02J 9/00 | (2006.01) | |
| H04L 12/00 | (2006.01) | |
| H04L 12/12 | (2006.01) | |

(52) U.S. Cl.
CPC ... *H02J 3/26* (2013.01); *G06F 1/28* (2013.01); *H02J 9/00* (2013.01); *H04L 12/00* (2013.01); *H04L 12/12* (2013.01); *Y10T 307/414* (2015.04)

(58) Field of Classification Search
CPC .......... H02J 3/26; H02J 3/00; Y10T 307/273; Y10T 307/414
USPC ....................................................... 307/14, 32
See application file for complete search history.

(56) References Cited

U.S. PATENT DOCUMENTS

| | | | |
|---|---|---|---|
| 6,859,882 B2 | 2/2005 | Fung | |
| 7,739,548 B2 | 6/2010 | Goodrum | |
| 7,904,287 B2 | 3/2011 | Lefurgy | |
| 8,307,224 B2 | 11/2012 | Conroy | |
| 2009/0228726 A1 | 9/2009 | Malik | |
| 2010/0211810 A1* | 8/2010 | Zacho | G06F 1/3203 713/324 |
| 2011/0239010 A1 | 9/2011 | Jain | |
| 2012/0185105 A1 | 7/2012 | McMullin | |
| 2012/0229077 A1 | 9/2012 | Tsuchiya | |

OTHER PUBLICATIONS

Eduardo Pinheiro et al., "Load Balancing and Unbalancing for Power and Performance in Cluster-Based Systems", Technical Report DCS-TR-440, May 2001.
Suffern, E.; Co-pending U.S. Appl. No. 13/723,252, filed Dec. 21, 2012, not yet published.

* cited by examiner

*Primary Examiner* — Carlos Amaya
(74) *Attorney, Agent, or Firm* — Olive Law Group, PLLC

(57) ABSTRACT

Systems and methods for power balancing in power distribution networks are disclosed herein. According to an aspect, a method may be implemented at a power manager in a power distribution network including multiple computing devices. The method may include receiving vital product data associated with the computing devices. The method may also include predicting, based on the vital product data, occurrences of unbalanced power in the power distribution system upon distribution of power to the computing devices. Further, the method may include controlling application of power to the computing devices, prior to distributing power in the power distribution system, based on the predicted occurrences such that power distribution to the power distribution system is substantially balanced.

20 Claims, 5 Drawing Sheets

POWER BALANCING IN POWER DISTRIBUTION NETWORKS

TECHNICAL FIELD

The present invention relates to power distribution networks, and more specifically, to balancing power in power distribution networks.

BACKGROUND

Power distribution networks provide and distribute power from a power source to a variety of devices and systems connected to the power distribution network. A three phase power supply is a common type of power source. In order for the power distribution network to perform efficiently, the load on each phase of the power supply should be kept substantially equal or balanced. Unequal loads, or an unbalanced power distribution, can lead to unequal power distribution and power overload on a specific phase within the power distribution network.

One technique of detecting an occurrence of unbalanced power is to determine the current load on each phase of the phases of power in the power distribution network. This determination can be made by sensing the load on each phase once the power has been applied throughout the power distribution network. Thus, a disadvantage of this technique is that power must be applied and distributed, and power overload incurred, to determine if the phases of power are unbalanced.

For at least the afore mentioned reasons, there is a need for improved systems and techniques for balancing power in power distribution networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods for power balancing in power distribution networks are disclosed herein. According to an aspect, a method may be implemented at a power manager in a power distribution network including multiple computing devices. The method may include receiving vital product data associated with the computing devices. The method may also include predicting, based on the vital product data, occurrences of unbalanced power in the power distribution system upon distribution of power to the computing devices. Further, the method may include controlling application of power to the computing devices, prior to distributing power in the power distribution system, based on the predicted occurrences such that power distribution to the power distribution system is substantially balanced.

According to another aspect, a system includes a power manager communicatively connected to a power distribution system including multiple computing devices. The power manager may be configured to receive vital product data associated with the computing devices. The power manager may also be configured to predict, based on the product data, occurrences of unbalanced power in the power distribution system upon distribution of power to the computing devices. Further, the power manager may be configured to control application of power to the computing devices, prior to distributing power in the power distribution system, based on the predicted occurrences such that power distribution to the power distribution system is substantially balanced.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
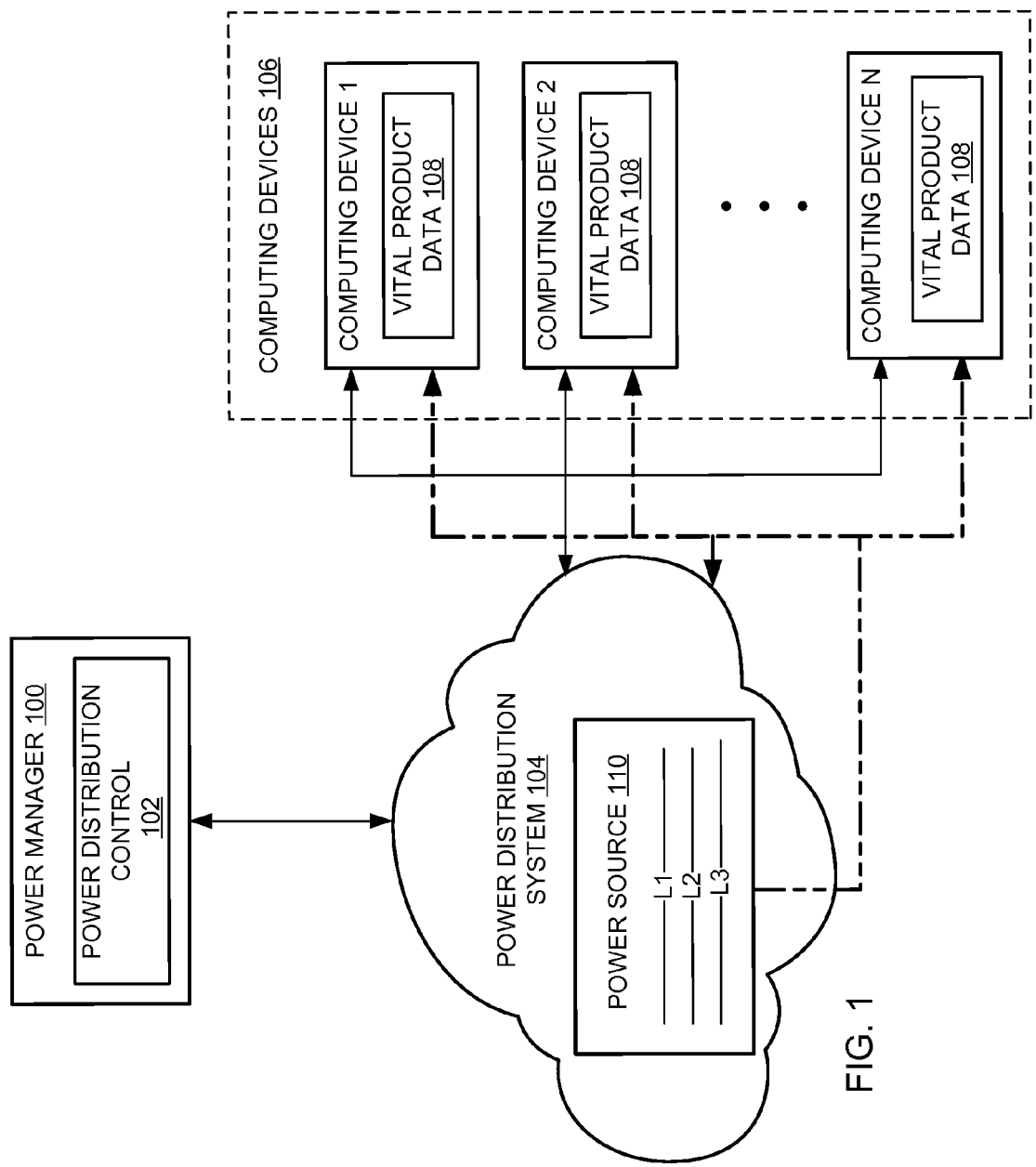
FIG. 1 is a block diagram of an example system for predicting occurrences of unbalanced power in a power distribution system in accordance with embodiments of the present invention.

FIG. 1 illustrates a block diagram of a system for predicting occurrences of unbalanced power in a power distribution system in accordance with embodiments of the present invention. Referring to FIG. 1, a power manager 100 may include a power distribution control module 102 for predicting occurrences of unbalanced power throughout a power distribution system 104. Power manager 100 may also be communicatively connected to multiple computing devices 106 over an Ethernet network or via the power distribution system 104 prior to applying full power to any of the computing devices. Each of the computing devices 106 may include vital product data 108. In an example, the computing devices 106 may be any type of computer such as, but not limited to, a personal computer, a server, or the like. In another example, vital product data 108 may be stored in a local storage associated with each of the computing devices 106. In a further example, vital product data 108 may include information associated with computing devices 106, such as, but not limited to, the maximum load or power consumption associated with each of the computing devices 106.

In accordance with the present invention, each of the computing devices 106 initially receives minimal stand-by power from a phased power source 110 within the power distribution network. Each of the computing devices 106 may be operatively connected within the power source 110 via at least one phase of the phases of power source 110. Even though FIG. 1 demonstrates a three-phase power source, it should be understood by those of skill in the art that power source 110 may have multiple phases. The power manager 100 may be configured to predict occurrences of unbalanced power from power source 110 by communicating with computing devices 106 as disclosed in further detail herein.

Figure 2:
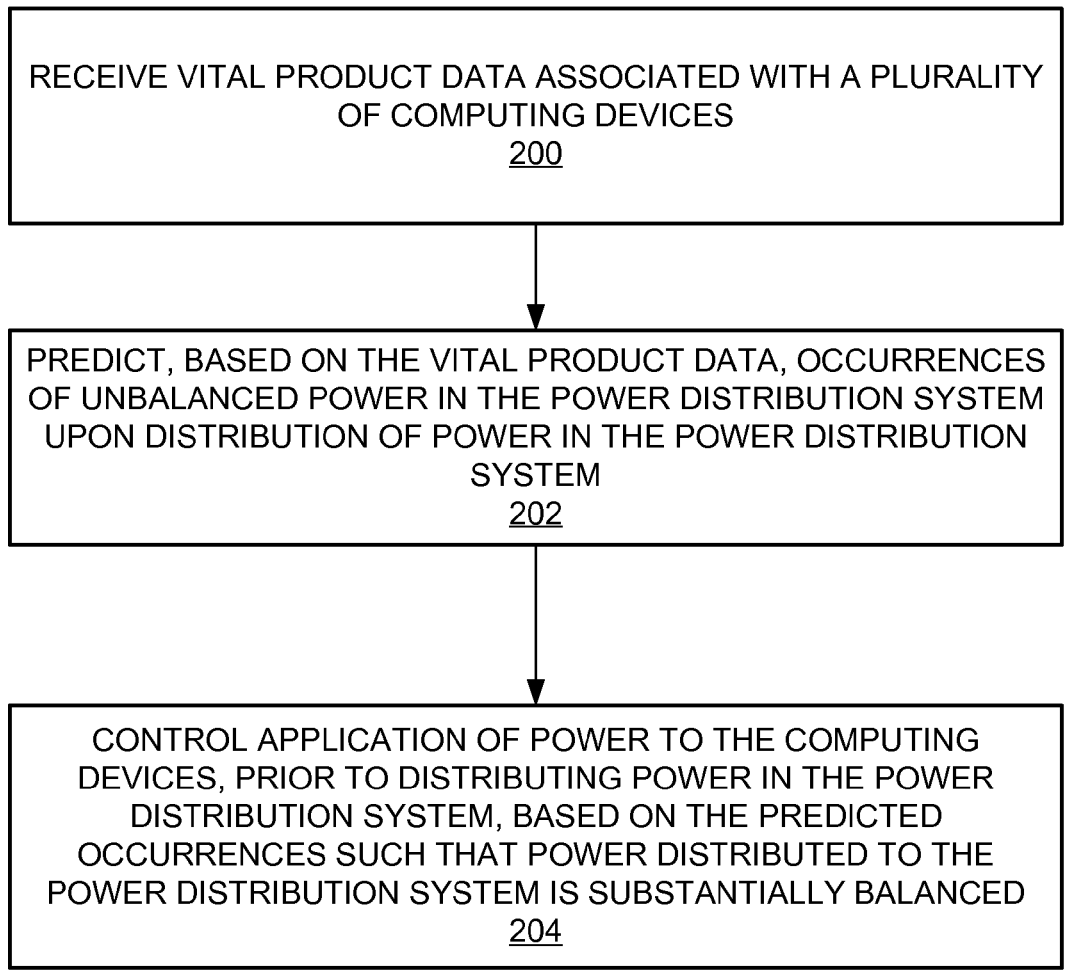
FIG. 2 is a flowchart of an example method for predicting occurrences of unbalanced power in a power distribution system in accordance with embodiments of the present invention.

FIG. 2 is a flowchart of an example method for predicting occurrences of unbalanced power in a power distribution system in accordance with embodiments of the present invention. In this example, the method is described as being implemented by the power distribution control module 102 of power manager 100 within power distribution environment shown in FIG. 1, although it should be understood that the method may be suitably implemented in any suitable device or environment. Referring to FIG. 2, the method includes receiving 200 vital product data associated with multiple computing devices. For example, the power manager 100 may receive vital product data 108 from computing devices 106. The method of FIG. 2 also includes predicting 202, based on the vital product data, occurrences of unbalanced power in the power distribution system upon distribution of power in the power distribution system. For example, the power manager 100 may predict, based on product data 108, an occurrence of unbalanced power from power source 110 upon distribution power from power source 110 to computing devices 106. Further example details as to the predicting step 202 are described in relation to FIG. 3 described herein below.

The method of FIG. 2 includes controlling 204 the application of power to the computing devices, prior to distributing full power in the power distribution system based on the predicted occurrences such that full power distributed to the power distributions system is substantially or entirely balanced. For example, power manager 100 controls the application of power from power source 110 to computing devices 106 prior to distributing the full power from power source 110 throughout power distribution system 104 based on predicted occurrence such that the full power from power source 110 distributed is substantially balanced. Further example details as to the controlling step 204 are described in relation to FIG. 4 described herein below.

Figure 3:
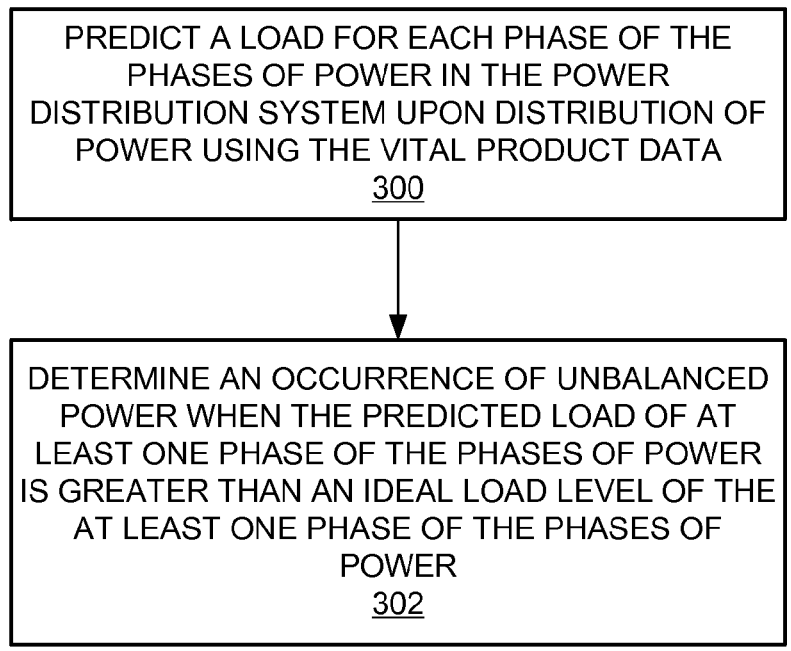
FIG. 3 is a flowchart of an example method for predicting a load for each phase of the phases of power in a power distribution system in accordance with embodiments of the present invention.

The power distribution control module 102 of power manager 100 may be configured to predict a load for each phase of the phases of power from power source 110 in the power distribution system 104 in accordance with embodiments of the present invention as shown in a flowchart of an example method as illustrated in FIG. 3. Referring to FIG. 3, the method includes predicting a load 300 for each phase of the phases of power in the power distribution system upon distribution of power using the received vital product data. For example, the power manager 100 can predict a load for each the phases L1, L2, and L3 of power source 110 upon distribution of full power from power source 110 using the product data 108 associated with the computing devices 106. Based on this information, the power manager 100 can determine the occurrence of an unbalanced power distribution system 302. Further example details are disclosed herein below regarding FIG. 5.

Figure 4:
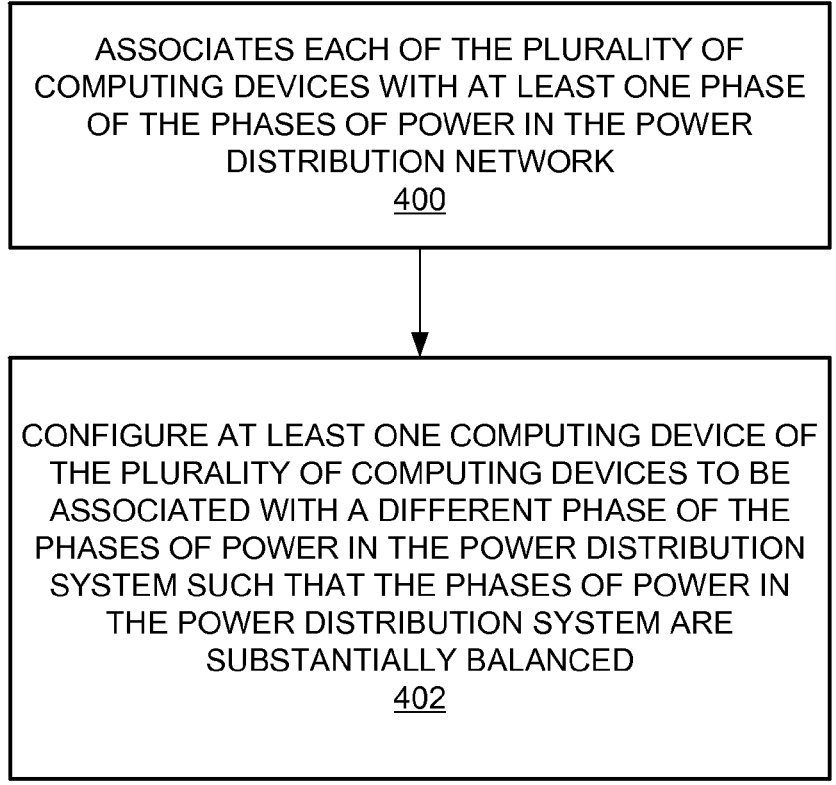
FIG. 4 is a flowchart of an example method for balancing the phases of power in the power distribution system in accordance with embodiments of the present invention.

As stated herein above, FIG. 4 is a flowchart of an example method for controlling the application of power to the computing devices, prior to distributing power in the power distribution system based on the predicted occurrences such that power distributed to the power distributions system is substantially balanced. Referring to FIG. 4, the method includes associating 400 each of the multiple computing devices with at least one phase of the phases of power in the power distribution network. For example, the power manager 100 associates each of the computing devices 106 with phases L1, L2, and L3 of the power from power source 110. The method of FIG. 4 also includes configuring 402 one or more of the computing device among the computing devices to be associated with a different phase of the phases of power in the power distribution system such that the phases of power in the power distribution system are substantially balanced. For example, power manager 100 may configure one or more of the computing devices 106 associated with phase L1 to be associated with a different phase, such as L2, so that the loads of phases L1, L2, and L3 are substantially or entirely balanced.

Figure 5:
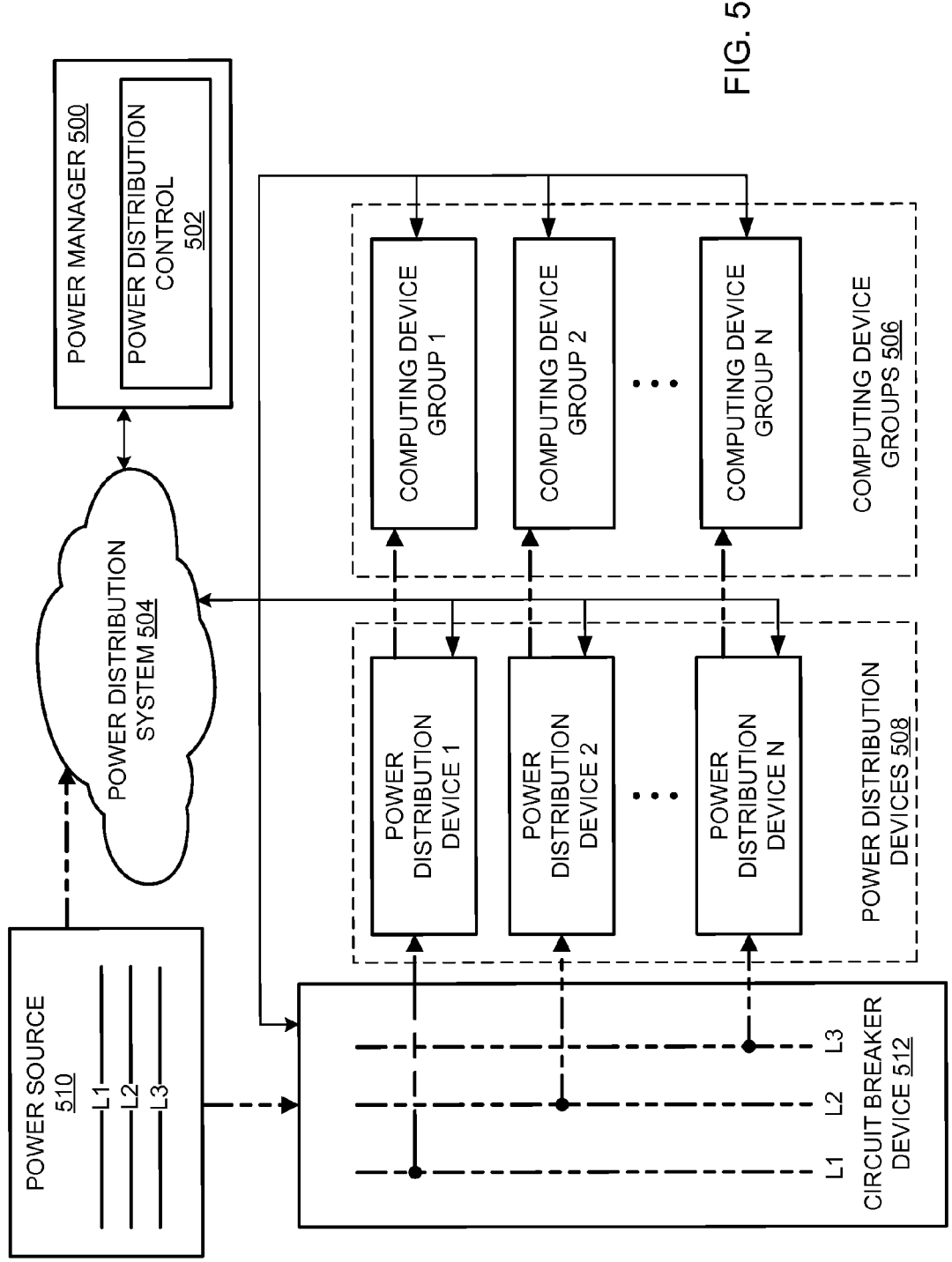
FIG. 5 is a block diagram of an example system associating each of multiple computing devices in a power distribution network with at least one phase of the phases of power in the power distribution network in accordance with embodiments of the present invention.

FIG. 5 illustrates a block diagram of an example system associating each of multiple computing devices in a power distribution network with one or more phases of power in a power distribution network in accordance with embodiments of the present invention. Referring to FIG. 5, power manager 500, power distribution control module 502, power distribution 504, and phased power source 510 are similar or substantially the same as FIG. 1. However, the block diagram of FIG. 5 illustrates multiple computing device groups 506. Each of the computing groups 506 includes multiple computing devices discussed previously regarding FIGS. 1-4. FIG. 5 also shows multiple power distribution devices 508, each of the power distribution devices 508 operatively connected to phases L1, L2, and L3, via a circuit breaker device 512. FIG. 5 also shows that the power distribution devices 508 operatively connect the phased power from circuit breaker device 512 to computing device groups 506.

FIG. 5 also shows that power manager 500 is communicatively connected to computing device groups 506, power distribution devices 508, and circuit breaker device 512 such that the power manager 500 can carry out a method in accordance with embodiments of the present invention discussed herein. In accordance with embodiments of the present invention, power manager 500 may receive vital product data associated with multiple computing devices. Power manager 500 can then predict, based on the vital product data, occurrences of unbalanced power in the power distribution system upon distribution of power in the power distribution system. For example, Table 1 illustrates the product data may include a maximum load for each of the multiple computing devices. In this example, the computing devices may be servers in a rack in a networking environment; however, it should be understood by those of skill in the art that computing devices can be a personal computer or any other suitable computing device. For example, servers 36-42 of a network server rack may include at least one computing device group of computing groups 506 of FIG. 5.

TABLE 1

System Total Power 25550
Ideal Load per Phase 8517

| Phases of Power | Predicted Phase Load | PDD | Predicted PDD Load | Computing Device | Max Load |
|---|---|---|---|---|---|
| L1 | 12450 | PDD #1 | 3050 | Server 42 | 450 |
| | | | | Server 41 | 350 |
| | | | | Server 40 | 350 |
| | | | | Server 39 | 550 |
| | | | | Server 38 | 450 |
| | | | | Server 37 | 450 |
| | | | | Server 36 | 450 |
| | | PDD #2 | 2200 | ● | ● |
| | | PDD #3 | 1000 | ● | ● |
| | | PDD #4 | 2500 | ● | ● |
| | | PDD #5 | 3700 | Server 8 | 600 |
| | | | | Server 7 | 600 |
| | | | | Server 6 | 350 |
| | | | | Server 5 | 400 |
| | | | | Server 4 | 400 |
| | | | | Server 3 | 450 |
| | | | | Server 2 | 600 |
| | | | | Server 1 | 300 |
| L2 | 9300 | PDU #6 | 3000 | ● | ● |
| | | PDU #7 | 2000 | ● | ● |
| | | PDU #8 | 2800 | ● | ● |
| | | PDU #9 | 1200 | ● | ● |
| | | PDU #10 | 300 | ● | ● |
| L3 | 3800 | PDU #11 | 300 | ● | ● |
| | | PDU #12 | 500 | ● | ● |
| | | PDU #13 | 1000 | ● | ● |
| | | PDU #14 | 1500 | ● | ● |
| | | PDU #15 | 500 | ● | ● |

As stated previously in regards to FIG. 5, computing groups 506 are operatively connected to power distribution devices 508. For example, Table 1 illustrates that servers 36-42 are associated with PDD #1. Power Manager 500 may also be configured to associate multiple computing devices with the power distribution devices and phases of a phased power source using a suitable technique.

Power manager 500 may be further configured to predict a load for each phase of the phases of power in the power distribution system upon distribution of power using the product data. For example, Table 1 shows that by compiling the max loads associated with each of the servers 36-42, power manager 500 may be able to predict a max load for PDD #1. In this example, power manager 500 may also be configured to repeat this compilation for each power distribution device 508 and each computing device in computing groups 506 as shown in Table 1 to predict a maximum load for each power distribution device of the multiple power distribution devices 508.

As stated previously, each of the power distribution devices 508 is operatively connected with at least one phase of the phased power from power source 510. Power manager 500 may be also configured to predict a load on each phase L1, L2, and L3 by compiling the predicted loads of each power distribution device associated with each phase. For example, Table 1 illustrates that the predicted load for phase L1 is a compilation of the predicted loads for power distribution devices 1-5.

In accordance with embodiments of the present invention, power manager 500 may be also configured to determine an occurrence of unbalanced power when the predicted load of at least one phase of the phases of power is greater than an ideal load level of the at least one phase of the phases of power. For example, Table 1 illustrates that the predicted load for L1 and for L2 is greater that than the ideal load level for each of the phases, which will create an occurrence of unbalanced power.

Further in accordance with the embodiments of the present invention, power manager 500 may be configured to configure at least one computing device of the multiple computing devices to be associated with a different phase of the phases of power in the power distribution system such that the phases of power in the power distribution system are substantially balanced. For example, Table 1 shows that even though phases L1 and L2 are overloaded, phase L3 is under loaded. Thus, power manager 500 may be configured to associate at least one power distribution device and its associated computing devices to another phase in order to balance phases L1, L2, and L3, as shown in Table 2.

TABLE 2

PDN Total Power 25550
Ideal Load per Phase 8517

| Phases of Power | Balanced Phase Load | PDD | PDD Predicted Load |
|---|---|---|---|
| L1 | 8750 | PDD #1 | 3050 |
| | | PDD #2 | 2200 |
| | | PDD #3 | 1000 |
| | | PDD #4 | 2500 |
| L2 | 8100 | PDD #6 | 3000 |
| | | PDD #7 | 2000 |
| | | PDD #8 | 2800 |
| | | PDD #10 | 300 |
| L3 | 8700 | PDD #5 | 3700 |
| | | PDD #9 | 1200 |
| | | PDD #11 | 300 |
| | | PDD #12 | 500 |
| | | PDD #13 | 1000 |
| | | PDD #14 | 1500 |
| | | PDD #15 | 500 |

As illustrated in Table 2, the power manager 500 may be configured to associate PDD #5 and PDD #9 with previously under loaded phase L3 such that the load of each phase L1, L2, and L3 is substantially ideal. Thus, in this example, the phases L1, L2, and L3 of power in the power distribution system are substantially balanced.

As stated previously, FIG. 5 illustrates that the power distribution devices 508 are operatively connected to phases L1, L2, and L3 via a circuit breaker device 512. FIG. 5 also illustrates that power manager 500 may be communicatively connected to circuit breaker device 512. Power manager 500 may also be configured to associate one or more of the computing devices of computing groups 506 with a different phase of the phases of power by controlling circuit breaker device 512 as illustrated in FIG. 6.

Figure 6:
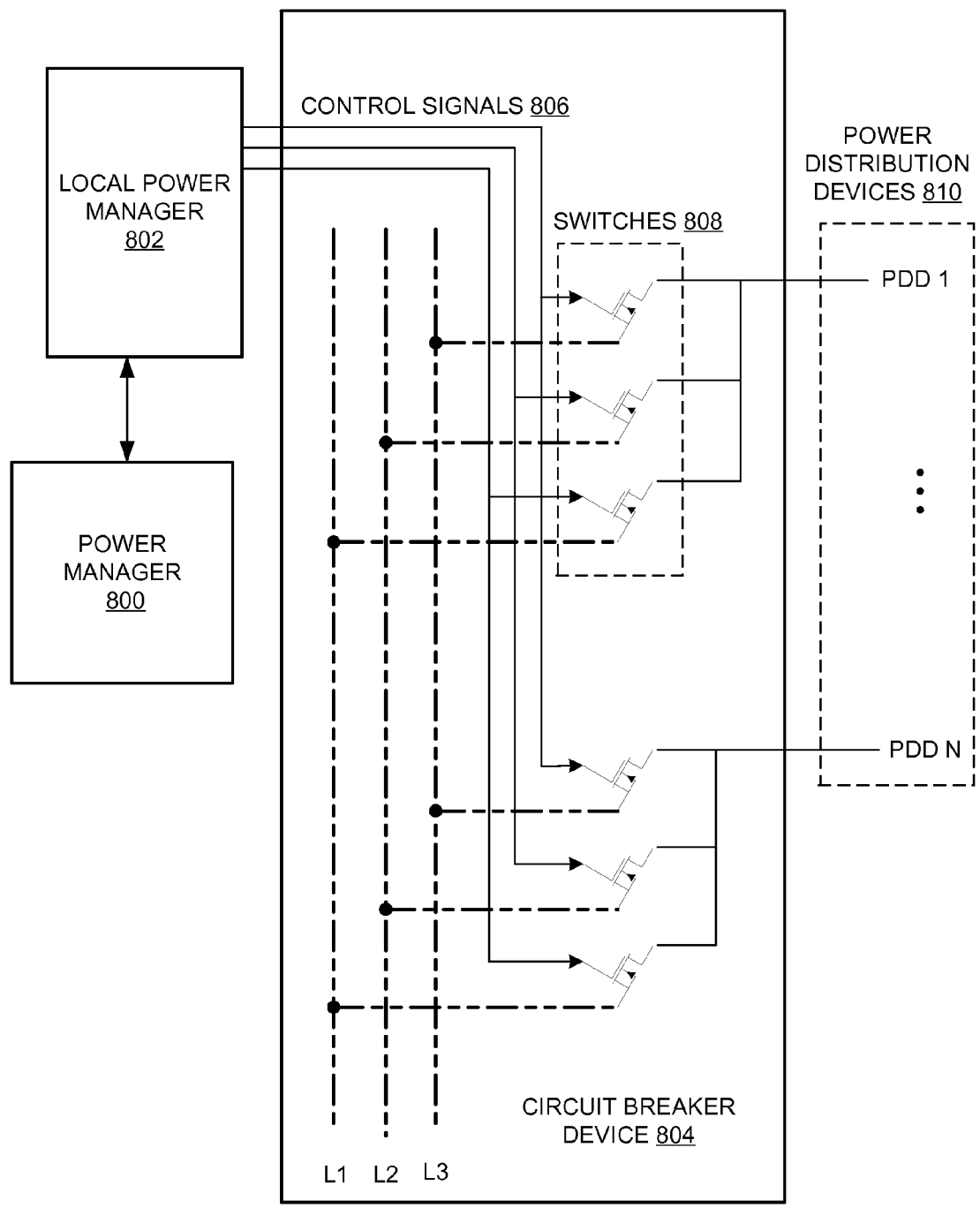
FIG. 6 is a block diagram of a circuit breaker device for switching a power distribution device from a first phase to a second phase of power in the power distribution network in accordance with embodiments of the present invention.

In accordance with embodiments of the present invention, FIG. 6 is a block diagram of a circuit breaker device for switching a power distribution device from a first phase to a second phase of power in the power distribution network. Referring to FIG. 6, power manager 800 may be communicatively connected to a circuit breaker device 804 via a local power manager 802 via control signals 806. In an example, local power manager 802 may be configured to provide a local interface between power manager 800 and circuit breaker device 804. However, one of skill in the art would appreciate that power manager 800 may also be configured to directly interface with circuit breaker device 804. FIG. 6 also illustrates multiple power distribution devices 810 are operatively connected to circuit breaker device 804 and phases L1, L2, and L3 via switches 808. Each switch of switches 808 may be operatively connected to one or more phases of the phases of power as illustrated in FIG. 6. The block diagram FIG. 6 also illustrates control signals 806 are communicatively connected to switches 808. Thus, power manager 800 may be configured to control application of power in the power distribution system by controlling the circuit breaker device 804 via controls signals 806 to switch at least one power distribution device of the multiple power distribution device 810 from a first phase to a second phase of power in the power distribution network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
    at a power manager communicatively connected to a power distribution system including a plurality of computing devices and a plurality of power distribution devices operatively connected to the plurality of computing devices:
    operatively connecting each power distribution device of the plurality of power distribution devices to a phase of power in the power distribution system, each computing device of the plurality of computing devices operatively connected to a phase of the power via one of the plurality of power distribution devices;
    receiving vital product data associated with each of the plurality of computing devices;
    predicting, based on the vital product data, occurrences of unbalanced power amongst phases of power in the power distribution system upon distribution of power to the plurality of computing devices; and
    prior to distributing maximum power in the power distribution system, operatively switching at least one power distribution device of the plurality of power distribution devices to a different phase of power via a switch in the power distribution system based on the predicted occurrences such that power distribution amongst the phases of power in the power distribution system is substantially balanced.

2. The method of claim 1, wherein the vital product data defines a maximum load for each of the plurality of computing devices.

3. The method of claim 1, wherein each of the plurality of computing devices is associated with at least one phase of the phases of power in the power distribution network.

4. The method of claim 1, wherein the predicting occurrences of unbalanced power comprises:
    using the vital product data to predict a load for each phase of the phases of power in the power distribution system upon distribution of power to the computing devices; and
    determining an occurrence of at least one unbalanced power when the predicted load of at least one phase of the phases of power is greater than an ideal load level of the at least one phase of the phases of power.

5. The method of claim 3, wherein controlling application of power comprises configuring at least one computing device of the plurality of computing devices to be associated with a different phase of the phases of power in the power distribution system such that the phases of power in the power distribution system are substantially balanced.

6. The method of claim 5, wherein the power manager comprises at least one processor and memory operatively connected to a circuit breaker device that operatively connects the computing devices to the phases of power in the power distribution system.

7. The method of claim 6, wherein each of the computing devices are coupled to the circuit breaker device through at least one power distribution device of a plurality of power distribution devices in the power distribution network.

8. The method of claim 7, wherein the circuit breaker device operatively connects each of the power distribution devices to a phase of the phases of power in the power distribution system via the switch.

9. The method of claim 8, wherein controlling application of power comprises controlling the circuit breaker device to switch at least one power distribution device from a first phase of the power to a second phase of the power in the power distribution system.

10. A system comprising:
    a power manager communicatively connected to a power distribution system including a plurality of computing devices and a plurality of power distribution devices operatively connected to the plurality of computing devices, the power manager being configured to:
    connect each power distribution device of the plurality of power distribution devices to a phase of power in the power distribution system, each computing device of the plurality of computing devices operatively connected to a phase of the power via one of the plurality of power distribution devices;
    receive vital product data associated with each of the plurality of computing devices;
    predict, based on the vital product data, occurrences of unbalanced power amongst phases of power in the power distribution system upon distribution of power to the plurality of computing devices; and
    switch, prior to distributing maximum power in the power distribution system, at least one power distribution device of the plurality of power distribution devices to a different phase of power via a switch in the power distribution system based on the predicted occurrences such that power distribution to the power distribution system is substantially balanced.

11. The system of claim 10, wherein the vital product data defines a maximum load for each of the plurality of computing devices.

12. The system of claim 10, wherein each of the plurality of computing devices is associated with at least one phase of the phases of power in the power distribution network.

13. The system of claim 10, wherein the power manager is configured to:

use the vital product data to predict a load for each phase of the phases of power in the power distribution system upon distribution of power to the computing devices; and determine an occurrence of at least one unbalanced power when the predicted load of at least one phase of the phases of power is greater than an ideal load level of the at least one phase of the phases of power.

14. The system of claim 12, wherein the power manager is configured to configure at least one computing device of the plurality of computing devices to be associated with a different phase of the phases of power in the power distribution system such that the phases of power in the power distribution system are substantially balanced.

15. The method of claim 14, wherein the power manager comprises at least one processor and memory, and wherein the system further comprises a circuit breaker device operatively connected to the at least one processor and memory, wherein the circuit breaker device operatively connects the computing devices to the phases of power in the power distribution system.

16. The method of claim 15, wherein the system further comprises a plurality of distribution devices operatively connected to the computing devices, wherein each of the computing devices are operatively connected to the circuit breaker device through at least one power distribution device of a plurality of power distribution devices in the power distribution network.

17. The method of claim 16, wherein the circuit breaker device operatively connects each of the power distribution devices to a phase of the phases of power in the power distribution system via the switch.

18. The method of claim 17, wherein the power manager is configured to control the circuit breaker device to switch at least one power distribution device from a first phase of the power to a second phase of the power in the power distribution system to balance the phases of power in the power distribution network.

19. A computer program product for power balancing in power distribution networks comprising a plurality of computing devices and a plurality of power distribution devices operatively connected to the plurality of computing devices, said computer program product comprising:

a computer readable non-transitory storage medium having computer readable program code embodied therewith, the computer readable program code comprising:

computer readable program code configured to operatively connect each power distribution device of the plurality of power distribution devices to a phase of power in the power distribution system, each computing device of the plurality of computing devices operatively connected to a phase of the power via one of the plurality of power distribution devices;

computer readable program code configured to receive vital product data associated with each of the plurality of computing devices in the power distribution system;

computer readable program code configured to predict, based on the vital product data, occurrences of unbalanced power amongst phases of power in the power distribution system upon distribution of power to the plurality of computing devices; and computer readable program code configured to switch, prior to distributing maximum power in the power distribution system, at least one power distribution device of the plurality of power distribution devices to a different phase of power via a switch in the power distribution system based on the predicted occurrences such that power distribution to the power distribution system is substantially balanced.

20. The computer program product of claim 19, wherein the product data defines a maximum load for each of the plurality of computing devices.

* * * * *